United States Patent [19]

Manabe et al.

[11] Patent Number: 4,599,061
[45] Date of Patent: Jul. 8, 1986

[54] HEATING DEVICE FOR USE IN VULCANIZING APPARATUS

[75] Inventors: Masahiro Manabe, Kyoto; Eiichi Nagafuchi; Yoshio Nohara, both of Kodaira, all of Japan

[73] Assignee: Bridgestone Corporation, Tokyo, Japan

[21] Appl. No.: 779,552

[22] Filed: Sep. 24, 1985

[30] Foreign Application Priority Data

Dec. 20, 1984 [JP] Japan .................. 59-192116[U]

[51] Int. Cl.⁴ ............................................. B29H 5/02
[52] U.S. Cl. ........................................ 425/41; 425/3; 425/DIG. 13; 249/78; 219/10.55 R; 219/10.57
[58] Field of Search ............... 425/40, 41, 3, DIG. 13; 249/78; 219/10.55, 10.57

[56] References Cited

U.S. PATENT DOCUMENTS

| | | | |
|---|---|---|---|
| 1,348,228 | 8/1920 | Ledwinka | 425/41 X |
| 1,379,595 | 5/1921 | Post | 425/41 |
| 1,505,686 | 9/1924 | Root | 425/41 X |
| 2,581,939 | 1/1952 | Deist et al. | 425/41 X |
| 2,738,406 | 3/1956 | Zaleski | 425/41 |
| 3,274,303 | 9/1966 | Muller | 425/3 X |
| 3,555,621 | 1/1971 | Hara | 425/3 |
| 3,564,654 | 2/1971 | Steingrovever | 425/3 |
| 3,892,505 | 7/1975 | Doucherain et al. | 425/41 |

*Primary Examiner*—J. Howard Flint, Jr.
*Attorney, Agent, or Firm*—Sughrue, Mion, Zinn, Macpeak, and Seas

[57] ABSTRACT

In a heating device for use in a vulcanizing apparatus in which a green tire is vulcanized by using a metal mold, three magnetic cores around each of which an electromagnetic coil is wound are arranged equidistantly on at least one surface of the metal mold, and a magnetic yoke is arranged on these magnetic cores. Then, three phase alternating currents are respectively supplied to the electromagnetic coils to generate uniform magnetic fluxes passing through portions of the metal mold between adjacent magnetic cores. Therefore, it is possible to obtain the heating device for use in the vulcanizing apparatus which can realize the uniform eddy current distribution i.e. the uniform temperature distribution in the metal mold by a simple construction.

10 Claims, 14 Drawing Figures

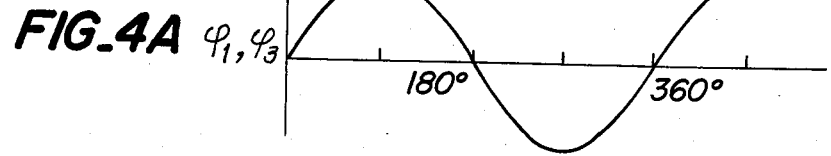
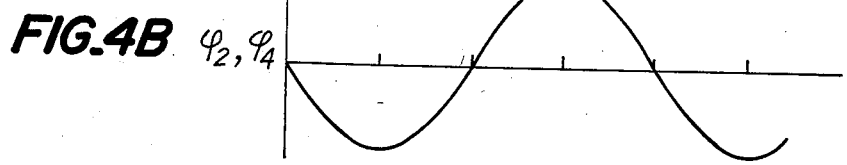
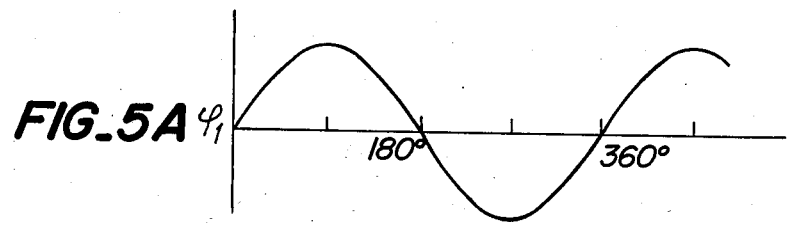
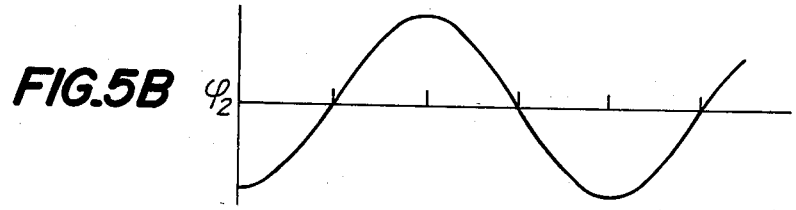
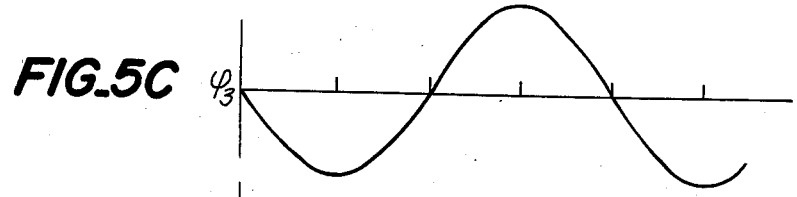
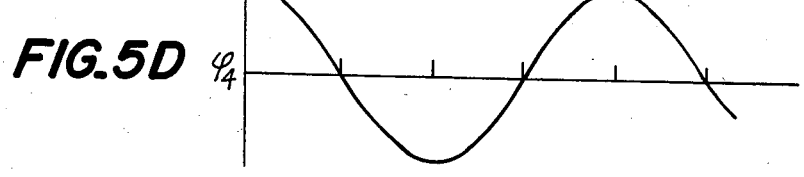

HEATING DEVICE FOR USE IN VULCANIZING APPARATUS

BACKGROUND OF THE INVENTION

1. Field of the Invention

The present invention relates to a tire vulcanizing apparatus, and especially relates to a heating device for use in the vulcanizing apparatus in which a metal mold for the tire vulcanization is heated by induction heating with the aid of electromagnetic induction coils.

2. Related Art Statement

Heretofore, as to a method for heating the metal mold used in the tire vulcanizing apparatus, there has been proposed a method for contacting a high-pressure steam or a high-temperature heat medium with the metal mold, or a method for heating the metal mold by a resistant heater. However, there are various drawbacks in the above methods such as a complicated maintenance operation and a low heat efficiency, and thus a further improvement is required.

In order to eliminate the drawbacks mentioned above, there has been proposed, in a Japanese Laid-open Publication No. 114,042/84, a tire vulcanizing apparatus in which a tire is vulcanized by inductively heating a metal mold by means of the electromagnetic coil. However, in this known tire vulcanizing apparatus, since a cylindrical coil is wound around an outer wall of the metal mold corresponding to a tire tread portion, a diameter of the coil must be substantially equal to that of the metal mold for the tire vulcanization. Therefore, the electromagnetic coil is made large in size, and the heat efficiency is made low because the coil has no magnetic core. Further, in the tire vulcanizing apparatus mentioned above, since a magnetic flux is passed through a portion other than the metal mold i.e. a vacant portion of the tire, there occurs a drawback that an inductively induced eddy current is not distributed uniformly over the metal mold and thus a uniform heating can not be achieved.

SUMMARY OF THE INVENTION

The present invention has for its object to eliminate the drawbacks mentioned above and to provide a heating device for use in a vulcanizing apparatus which can realize a uniform eddy current distribution over a metal mold i.e. a uniform temperature distribution over the metal mold, can realize a good efficiency, and has a simple construction.

According to the invention, a heating device for use in a vulcanizing apparatus having a metal mold in which a green tire is vulcanized, comprises at least three magnetic cores arranged equidistantly on an outer surface of said metal mold in a contact manner;

at least three electromagnetic coils each wound around respective magnetic cores; and a magnetic yoke arranged on said magnetic cores in a contact manner; whereby alternating currents are supplied respectively to said electromagnetic coils to generate magnetic fluxes passing portions of said metal mold between adjacent magnetic cores.

BRIEF DESCRIPTION OF THE DRAWINGS

FIGS. 4A and 4B, and FIGS. 5A to 5D are waveforms respectively showing an alternating current supplied to an electromagnetic coil;

DESCRIPTION OF THE PREFERRED EMBODIMENTS

Figure 1:
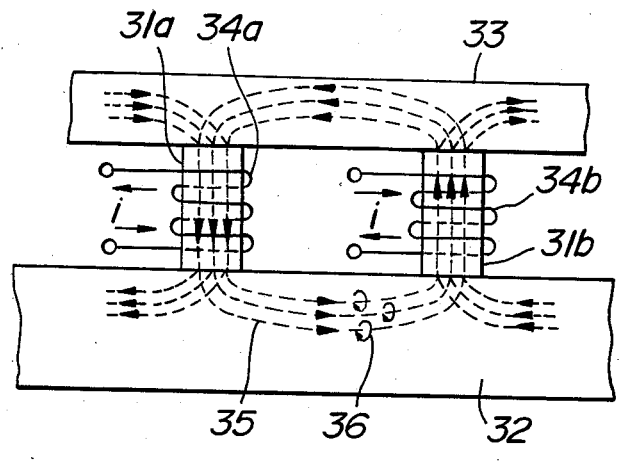
FIG. 1 is a schematic view showing one principal construction of the heating device according to the invention which utilizes the induction heating theory.

FIG. 1 is a schematic view showing a principal construction of the heating device according to the invention which utilizes the induction heating theory. In FIG. 1, respective one ends of three or more than three magnetic cores 31a, 31b, . . . made of silicon steel plate are brought into contact with an outer surface of a metal mold 32 for a tire vulcanization, and the other ends thereof are connected to a common yoke 33 made of silicon steel. Moreover, induction coils 34a, 34b, . . . are wound around respective magnetic cores 31a, 31b, . . . . As mentioned below, the common yoke 33 has, for example, a ring shape corresponding to the circular metal mold 32. Under such a condition, when alternating currents i having given phase difference therebetween are respectively supplied to the induction coils 34a, 34b, magnetic fluxes due to an electromagnetic induction are generated in the magnetic cores 31a, 31b and the thus generated magnetic fluxes are passed through portions of the yoke 33 and portions of the metal mold 32 between adjacent magnetic cores as shown in FIG. 1. In this manner, the magnetic fluxes 35 are uniformly induced in the metal mold 32. Since the magnetic fluxes 35 are varied with respect to time, in the metal mold 32 eddy currents 36 are induced correspondingly around the magnetic fluxes 35. An eddy current produced in unit volume of the metal mold 32 is unmeasurably small, but a total current uniformly generated in the metal mold 32 becomes large. Therefore, Joule heat due to the eddy current 36 is generated in the metal mold 32 for the tire vulcanization, and thus the metal mold 32 is heated effectively. In this electromagnetic induction heating, there are large advantages that a rapid heating can be effected due to a generation of large eddy current if a power supplied to the coils becomes large, and thus a power capacity per unit area is not limited as compared with the known resistive heating. In the present invention, it is possible to generate the magnetic fluxes 35 uniformly in the metal mold 32 by suitably selecting phases of alternating currents supplied to coils 34a, 34b, . . . , and thus the metal mold 32 can be uniformly heated.

Figure 2A:
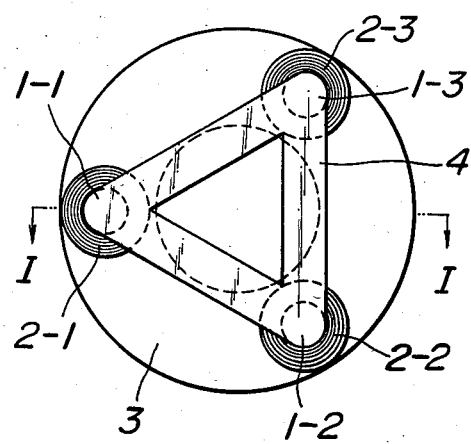
FIG. 2A is a plan view illustrating one embodiment of the heating device according to the invention.
Figure 2B:
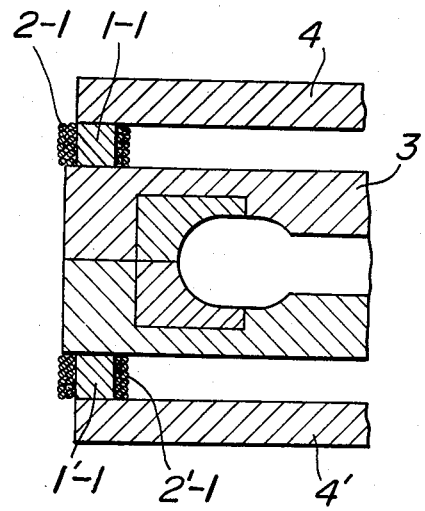
FIG. 2B is a cross sectional view cut along I—I line of the embodiment shown in FIG. 2A.

FIG. 2A is a plan view showing an embodiment of the heating device according to the invention, and FIG. 2B is a cross sectional view cut along I—I line of the embodiment shown in FIG 2A. In FIG. 2A, three electromagnetic coils 2-1, 2-2 and 2-3 are respectively wound around three magnetic cores 1-1, 1-2 and 1-3 each made of the silicon steel, and the magnetic cores 1-1, 1-2 and 1-3, one end of which is brought into contact with a metal mold 3, are arranged equidistantly on an upper surface of the metal mold 3 for the tire vulcanization in a substantially concentric manner. Moreover, a triangular magnetic yoke 4 is arranged on the other ends of the magnetic cores 1-1, 1-2 and 1-3 to constitute a closed magnetic circuit. As shown in FIG. 2B, also on a lower surface of the metal mold 3 is arranged a closed magnetic circuit consisting of metal cores 1'-1..., electromagnetic coils 2'-1... and a yoke 4'. In the heating deivce mentioned above, if three-phase alternating currents whose phases are relatively shifted by 120° are respectively supplied to the electromagnetic coils 1-1, 1-2 and 1-3, the magnetic fluxes are uniformly induced in the metal mold between adjacent magnetic cores i.e. between cores 1-1 and 1-2, between cores 1-2 and 1-3 and between cores 1-3 and 1-2, and thus the eddy currents are generated uniformly in the metal mold. Therefore, the metal mold 3 can be uniformly heated.

Figure 3:
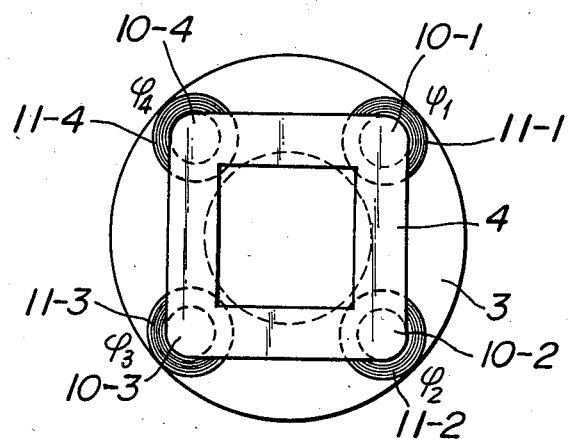
FIG. 3 is a plan view depicting another embodiment of the heating apparatus according to the invention.

FIG. 3 is a plan view showing another embodiment of the heating device according to the invention. In this embodiment, four magnetic cores 10-1 to 10-4 around which electromagnetic coils 11-1 to 11-4 are wound are arranged equidistantly on the surface of the metal mold 3 in a contact manner, and a rectangular yoke 4 is arranged on these magnetic cores 10-1 to 10-4 also in a contact manner. In the heating device mentioned above, if alternating currents $\psi_1$, $\psi_2$, $\psi_3$ and $\psi_4$, phases of $\psi_1$, $\psi_3$ being shifted by 180° from those of $\psi_2$, $\psi_4$ as shown in FIGS. 4A and 4B, are respectively supplied to the electromagnetic coils 11-1 to 11-4, the same magnetic fluxes are always induced in the metal mold between adjacent magnetic cores, and thus the metal mold 3 can be heated more uniformly and effectively. In this case, if the coil winding direction of the coils 11-1 to 11-4 is varied alternately, the alternating currents having the same phase can be supplied thereto instead of supplying the alternating currents $\psi_1$, $\psi_2$, $\psi_3$ and $\psi_4$ shown in FIGS. 4A and 4B. Further, the metal mold 3 can be also uniformly heated by supplying alternating currents $\psi_1$ to $\psi_4$ shown in FIGS. 5A to 5D, phases of $\psi_1$ to $\psi_4$ being relatively shifted by 90° from each other, to the electromagnetic coils 11-1 to 11-4 respectively, but in this case the efficiency becomes a little decreased.

Figure 6:
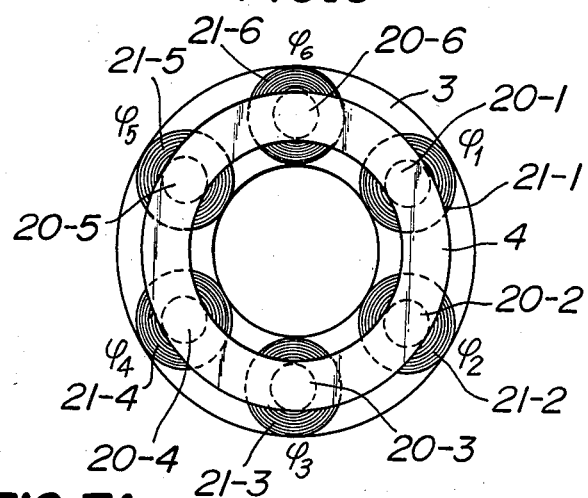
FIG. 6 is a plan view illustrating still another embodiment of the heating apparatus according to the invention.

FIG. 6 is a plan view showing still another embodiment of the heating device according to the invention. In this embodiment, six magnetic cores 20-1 to 20-6 around which electromagnetic coils 21-1 to 21-6 are wound are arranged equidistantly on the surface of the metal mold 3 in a contact manner, and a ring-shaped yoke 4 is arranged on these magnetic cords 20-1 to 20-6 also in a contact manner. In the heating device mentioned above, among alternating currents $\psi_1$ to $\psi_6$ to be supplied to the magnetic cores 20-1 to 20-6, if use are made of the alternating current shown in FIG. 4A as $\psi_1$, $\psi_3$, $\psi_5$ and the alternating current shown in FIG. 4B as $\psi_2$, $\psi_4$, $\psi_6$, the metal mold 3 can be uniformly heated by the electromagnetic induction heating. Further in this case, the metal mold 3 may be uniformly heated by supplying alternatively the commercially available three-phase alternating current as $\psi_1$, $\psi_3$, $\psi_5$ and $\psi_2$, $\psi_4$, $\psi_6$ to the electromagnetic coils 21-1 to 21-6.

Figure 7A:
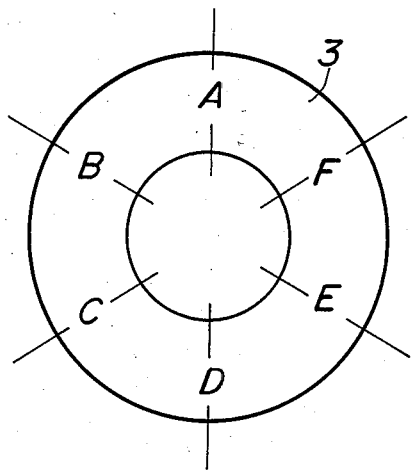
FIG. 7A is a schematic view illustrating arranging positions of magnetic cores according to the invention.
Figure 7B:
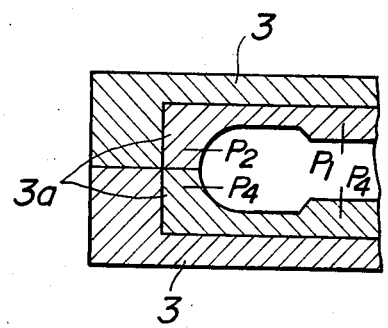
FIG. 7B is a schematic view depicting temperature measuring positions during induction heating.

Hereinafter, the result of an actual induction heating will be explained with reference to a temperature variation of a tread mold 3a made of an aluminium alloy. Table 1 shows the result of the actual induction heating in an embodiment in which three magnetic cores and three electromagnetic coils are arranged on either surfaces of the metal mold 3 at the positions A, C and E in a plan view shown in FIG. 7A. Moreover, the temperature measurement is performed at the positions $P_1$ $P_2$, $P_3$ and $P_4$ shown in FIG. 7B on respective cross sections A to E illustrated in FIG. 7A.

TABLE 1

| | (°C.) | | | | | |
|---|---|---|---|---|---|---|
| | A | B | C | D | E | F |
| $P_1$ | 201 | 175 | 205 | 176 | 206 | 175 |
| $P_2$ | 205 | 178 | 207 | 179 | 204 | 178 |
| $P_3$ | 206 | 179 | 208 | 180 | 205 | 179 |
| $P_4$ | 199 | 177 | 203 | 179 | 202 | 176 |

As shown in Table 1, temperatures at A, C and E positions on which the magnetic cores are arranged is slightly higher than those at B, D and F positions on which no magnetic core is arranged. However, the temperature variation on respective cross sections is not detected so much, and thus it is understood that the metal mold is uniformly heated. Table 2 shows the result of the actual induction heating in another embodiment in which six magnetic cores and six electromagnetic coils are arranged on either surfaces of the metal mold 3 at the positions A, B, C, D, E and F in a plan view shown in FIG. 7A. Moreover, as is the same as the embodiment mentioned above, the temperature measurement is performed at the positions P, $P_2$, $P_3$ and $P_4$ shown in FIG. 7B on respective cross sections A to E illustrated in FIG. 7B.

TABLE 2

| | (°C.) | | | | | |
|---|---|---|---|---|---|---|
| | A | B | C | D | E | F |
| $P_1$ | 205 | 206 | 206 | 204 | 205 | 206 |
| $P_2$ | 208 | 209 | 208 | 207 | 207 | 208 |
| $P_3$ | 209 | 208 | 210 | 207 | 208 | 210 |
| $P_4$ | 203 | 202 | 204 | 202 | 203 | 205 |

Figure 8:
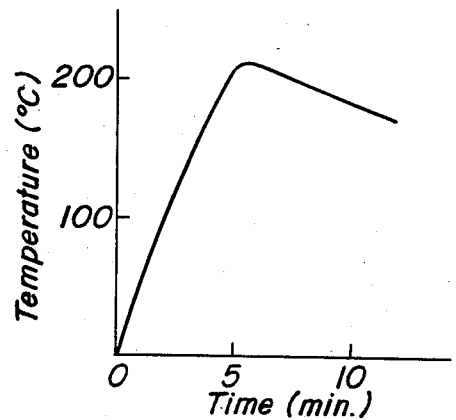
FIG. 8 is a graph showing a relation between temperature and time during induction heating.

As shown in Table 2, the present embodiment can be achieved more uniform heating of the metal mold as compared with the embodiment mentioned above. FIG. 8 is a graph showing a relation between a time and a temperature in case that the metal mold is inductively heated by the present embodiment utilizing six magnetic cores. From the above, according to the present invention, it is possible to heat the metal mold rapidly to a predetermined vulcanization temperature.

The present invention is not limited to the embodiments mentioned above, but various modifications are possible. For example, in the embodiments mentioned above, the heating device according to the invention is used for all the heating operations during the vulcanization step, but it is possible to use the heating device according to the invention only for a pre-heating, while the heating of the actual vulcanization is performed by a high-pressure steam. Moreover, the method for supplying the alternating current is not limited to the embodiments mentioned above, but use may be made of various methods wherein the magnetic flux is induced in the metal mold between adjacent magnetic cores. Further, in case that use is made of the even number of the magnetic cores, if the coil winding direction is made alternately reverse directions, it is possible to supply the alternating currents having the same phase to all the electromagnetic coils. Moreover, in the embodiments explaned above, use are made of sinusoidal alternating currents, but use may be made of alternating currents having various waveforms such as triangular waveform.

As mentioned above, according to the invention, it is possible to obtain the heating device for use in the vulcanizing apparatus which can realize the uniform eddy current distribution in the metal mold i.e. the uniform temperature distribution in the metal mold by a simple construction and can realize the good efficiency. Especially in case of using the even number of the magnetic cores, if alternating currents of opposite phases are respectively supplied to adjacent magnetic cores, it is possible to heat the metal mold in the most efficient manner.

What is claimed is:

1. A heating device for use in a vulcanizing apparatus having a metal mold in which a green tire is vulcanized, comprising
   at least three magnetic cores arranged equidistantly on an outer surface of said metal mold in a contact manner; and
   at least three electromagnetic coils each wound around respective magnetic cores.

2. A heating device according to claim 1, wherein said magnetic core is made of a silicon steel.

3. A heating device according to claim 1, wherein three magnetic cores around each of which said electromagnetic coils are wound and are all in the same winding direction and three phase alternating currents having 120° phase difference are respectively supplied to each of said three electromagnetic coils.

4. A heating device according to claim 3, wherein commercially available three-phase alternating currents are supplied to the electromagnetic coils.

5. A heating device according to claim 1, wherein four magnetic cores around each of which an electromagnetic coil is wound in the same winding direction are arranged on outer surfaces of said metal mold, and alternating currents having 180° phase difference therebetween are supplied to adjacent electromagnetic coils.

6. A heating device according to claim 1, wherein four magnetic cores around each of which an electromagnetic coil is wound in the same winding direction are arranged on outer surfaces of said metal mold, and alternating currents having 90° phase difference therebetween are supplied to adjacent electromagnetic coils.

7. A heating device according to claim 1, wherein six magnetic cores around each of which an electromagnetic coil is wound in the same winding direction are arranged on outer surfaces of said metal mold, and alternating currents having 180° phase difference therebetween are supplied to adjacent electromagnetic coils.

8. A heating device according to claim 1, wherein six magnetic cores around each of which an electromagnetic coil is wound in the same winding direction are arranged on outer surfaces of said metal mold, and alternating current having 120° phase difference therebetween are supplied to adjacent electromagnetic coils.

9. A heating device according to claim 8, wherein commercially available three-phase alternating currents are supplied to said electromagnetic coils.

10. A heating device according to claim 1, wherein the even number of magnetic cores around each of which an electromagnetic coil is wound in the opposite winding direction alternately are arranged on outer surfaces of said metal mold, and alternating currents having the same phase are supplied to the electromagnetic coils.

* * * * *